United States Patent
Muramatsu et al.

(10) Patent No.: US 10,696,251 B2
(45) Date of Patent: Jun. 30, 2020

(54) VEHICLE

(71) Applicant: HONDA MOTOR CO., LTD., Minato-ku, Tokyo (JP)

(72) Inventors: Miharu Muramatsu, Wako (JP); Hiroo Yamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 16/128,609

(22) Filed: Sep. 12, 2018

(65) Prior Publication Data
US 2019/0084508 A1    Mar. 21, 2019

(30) Foreign Application Priority Data

Sep. 15, 2017 (JP) ................................ 2017-177244

(51) Int. Cl.
| | |
|---|---|
| B60K 6/40 | (2007.10) |
| B60R 16/033 | (2006.01) |
| H02J 4/00 | (2006.01) |
| H02G 3/08 | (2006.01) |
| B60L 1/00 | (2006.01) |
| H02G 3/16 | (2006.01) |
| B60L 50/60 | (2019.01) |
| H02G 15/117 | (2006.01) |
| H02G 3/30 | (2006.01) |
| B60L 1/02 | (2006.01) |

(Continued)

(52) U.S. Cl.
CPC .............. *B60R 16/033* (2013.01); *B60K 6/40* (2013.01); *B60L 1/003* (2013.01); *B60L 1/02* (2013.01); *B60L 50/66* (2019.02); *B60R 16/03* (2013.01); *H02G 3/083* (2013.01); *H02G 3/16* (2013.01); *H02G 3/30* (2013.01); *H02G 15/117* (2013.01); *H02J 4/00* (2013.01); *H02J 7/14* (2013.01); *B60K 6/20* (2013.01); *B60L 2240/34* (2013.01); *B60L 2270/145* (2013.01); *B60Y 2200/11* (2013.01); *B60Y 2200/92* (2013.01); *B60Y 2410/115* (2013.01); *H01R 4/42* (2013.01); *H01R 13/5208* (2013.01)

(58) Field of Classification Search
CPC ..... B60R 16/0207; B60R 16/238; B60K 6/40; B60K 6/405; B60L 15/007
See application file for complete search history.

(56) References Cited

U.S. PATENT DOCUMENTS

| | | | | |
|---|---|---|---|---|
| 9,415,697 B2 * | 8/2016 | Asai | ...................... | B60L 11/182 |
| 9,539,908 B2 * | 1/2017 | Asai | ...................... | B60L 11/18 |

(Continued)

FOREIGN PATENT DOCUMENTS

JP        09-277840        10/1997

*Primary Examiner* — Bryan A Evans
(74) *Attorney, Agent, or Firm* — Amin, Turocy & Watson, LLP

(57) ABSTRACT

A vehicle includes a first power distribution branch unit disposed between an energy storage device and a power conversion device and configured to branch current from the energy storage device and supply the current to the power conversion device and an electric auxiliary machine. A travel motor and the power conversion device are supported by a sub frame. The energy storage device is supported by a main frame. The first power distribution branch unit is fixed to a part of a vehicle body that is different from the sub frame or the main frame (for example, fixed to a dashboard).

6 Claims, 10 Drawing Sheets

(51) Int. Cl.
*B60R 16/03* (2006.01)
*H02J 7/14* (2006.01)
*H01R 4/42* (2006.01)
*B60K 6/20* (2007.10)
*H01R 13/52* (2006.01)

(56) References Cited

U.S. PATENT DOCUMENTS

| | | | |
|---|---|---|---|
| 9,725,004 B2 * | 8/2017 | Asai | B60K 1/04 |
| 10,144,300 B2 * | 12/2018 | Asai | H02J 50/10 |
| 2016/0052403 A1 * | 2/2016 | Asai | H02J 50/10 |
| | | | 307/10.1 |
| 2016/0052408 A1 * | 2/2016 | Asai | B60L 11/182 |
| | | | 180/65.1 |
| 2016/0082847 A1 * | 3/2016 | Asai | B60K 1/04 |
| | | | 307/10.1 |
| 2016/0243948 A1 * | 8/2016 | Asai | B60L 50/64 |

* cited by examiner

VEHICLE

CROSS-REFERENCE TO RELATED APPLICATION

This application is based upon and claims the benefit of priority from Japanese Patent Application No. 2017-177244 filed on Sep. 15, 2017, the contents of which are incorporated herein by reference.

BACKGROUND OF THE INVENTION

Field of the Invention

The present invention relates to a vehicle including a power distribution branch unit that branches current.

Description of the Related Art

An object of Japanese Laid-Open Patent Publication No. 09-277840 is to improve the workability of assembling a DC-DC converter that is disposed at a bottom of a high-voltage box, lowers DC power of a battery mounted in a vehicle, and supplies the lowered power to various electric devices mounted in the vehicle ([0002], Abstract). In order to achieve this object, in Japanese Laid-Open Patent Publication No. 09-277840 (Abstract), the power of the battery mounted in the vehicle is supplied to a junction box 17 through a high-voltage connector 49, and is distributed from the junction box 17 to a motor driving inverter 13 and a DC/DC converter 15.

The motor driving inverter 13 converts the DC power of the battery into AC power, and drives a motor for traveling a vehicle in accordance with an instruction of a motor controller 19. The DC/DC converter 15 lowers the DC power of the battery and supplies the lowered power to various electric devices mounted in the vehicle. The DC/DC converter 15 is fixed on a fixing plate 23 and can be detached independently. The DC/DC converter 15 is connected to the junction box 17 by a male connector 41 and a female connector 39 of a high-voltage terminal (Abstract).

The motor driving inverter 13, the DC/DC converter 15, and the junction box 17 are all disposed inside a high-voltage box 1 (FIG. 1, [0023], [0024]). The high-voltage box 1 is disposed in approximately the center inside a motor room 5 (FIG. 2, [0022]).

SUMMARY OF THE INVENTION

As described above, in Japanese Laid-Open Patent Publication No. 09-277840, the motor driving inverter 13, the DC/DC converter 15, and the junction box 17 are disposed inside the high-voltage box 1. However, since the high-voltage box 1 is disposed inside the motor room 5, vibration from a travel motor or an engine (in a case of a hybrid vehicle) is likely to be transmitted to them. Therefore, there is room for improvement from the viewpoint of improving the connection strength of a wiring branch part of the junction box 17 (power distribution branch unit).

The present invention has been made in view of the above problem, and an object is to provide a vehicle in which the connection strength of a wiring branch part in a power distribution branch unit can be improved.

A vehicle according to the present invention includes a travel motor; an energy storage device configured to supply power to the travel motor; a power conversion device disposed between the travel motor and the energy storage device; an electric auxiliary machine; and a first power distribution branch unit disposed between the energy storage device and the power conversion device and configured to branch current from the energy storage device and supply the current to the power conversion device and the electric auxiliary machine, wherein: the travel motor and the power conversion device are supported by a sub frame; the energy storage device is supported by a main frame; and the first power distribution branch unit is fixed to a part of a vehicle body that is different from the sub frame and the main frame.

According to the present invention, the first power distribution branch unit is fixed to a part of a vehicle body that is different from the sub frame (that supports the travel motor and the power conversion device) and the main frame (that supports the energy storage device). Thus, the vibration from the travel motor is less likely to transmit to the first power distribution branch unit. In the vehicle that always generates vibration, electric connections in the power distribution branch unit can be maintained easily in a favorable manner.

The vehicle may further include an engine supported by the sub frame. Thus, even if the engine generates stronger vibration than the travel motor, the vibration from the engine is less likely to transmit to the first power distribution branch unit. Therefore, the electric connection in the first power distribution branch unit can be maintained easily in a more favorable manner.

The energy storage device may be provided with a second power distribution branch unit. The first power distribution branch unit may be disposed between the second power distribution branch unit and the power conversion device. Thus, the wirings can be led easily as compared to a case where a wiring that directly connects the second power distribution branch unit, and the power conversion device and the electric auxiliary machine is provided without using the first power distribution branch unit.

The engine, the travel motor, and the power conversion device may be disposed on a front side of the vehicle. The first power distribution branch unit may be disposed on a dashboard. The electric auxiliary machine may include an air conditioner.

Thus, even if the first power distribution branch unit is supported by or fixed to a part of the vehicle body that is different from the sub frame or the main frame, the first power distribution branch unit can be disposed in a position relatively close to the power conversion device. Furthermore, the first power distribution branch unit can be also disposed in a position relatively close to the air conditioner, in addition to the power conversion device; therefore, space saving can be easily achieved.

An air compressor and a heater of the air conditioner may be supported by the sub frame. The first power distribution branch unit may branch current from the energy storage device and supply the current to the power conversion device, the air compressor, and the heater.

Thus, the first power distribution branch unit disposed on the dashboard can branch the current relatively near the power conversion device, the air compressor, and the heater. Therefore, for example, as compared to a case in which the first power distribution branch unit is provided adjacent to the energy storage device, the wiring from the energy storage device to the first power distribution branch unit (for example, the main wiring that will be described later) can be made long and the wiring from the first power distribution branch unit to the power conversion device, the air compressor, or the heater (for example, the auxiliary machine wiring that will be described later) can be made short.

Therefore, the total amount of wirings to be used can be reduced and the wirings can be led easily.

The first power distribution branch unit may include: a case; at least one main covered cable configured to penetrate through the case and including an exposed part where a core wire is exposed without an insulation cover inside the case; a branch wiring disposed inside the case and having one end connected to the exposed part of the main covered cable; a branch coupler connected to another end of the branch wiring and fixed to the case so as to be exposed to an outside; and at least one retainer disposed inside a hole part that is formed in the case and configured to fix the main covered cable.

In the present invention, the main covered cable penetrates through the case. On the other hand, the branch coupler is disposed through the branch wiring that is connected to the exposed part of the main covered cable. Thus, by branching the power line without a connector (coupler), the layout flexibility can be improved and the first power distribution branch unit can be downsized.

The branch wiring and the core wire that is exposed without the insulation cover are connected. Thus, the position of the exposed part of the core wire can be selected; therefore, the layout flexibility is improved.

Furthermore, the main covered cable is fixed by the case through the retainer. Thus, if vibration transmits from the outside to the inside of the case through the main covered cable, the retainer can absorb the vibration. In particular, if the vibration absorption characteristic of the retainer is higher than that of the case itself, the vibration can be easily absorbed. Thus, the vibration from outside is less likely to reach the connection part where the branch wiring and the exposed part of the core wire are connected. Therefore, it becomes easy to prevent the separation between the core wire and the branch wiring due to vibration reaching the connection part from outside.

A fuse may be provided to the branch wiring. Thus, even if vibration always occurs due to the travel motor or the like, the connection of the fuse can be maintained easily in a favorable manner.

According to the present invention, the connection strength of the wiring branch part in the power distribution branch unit can be improved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. First Embodiment

A-1. Structure

[A-1-1. Overall Structure]

Figure 1:
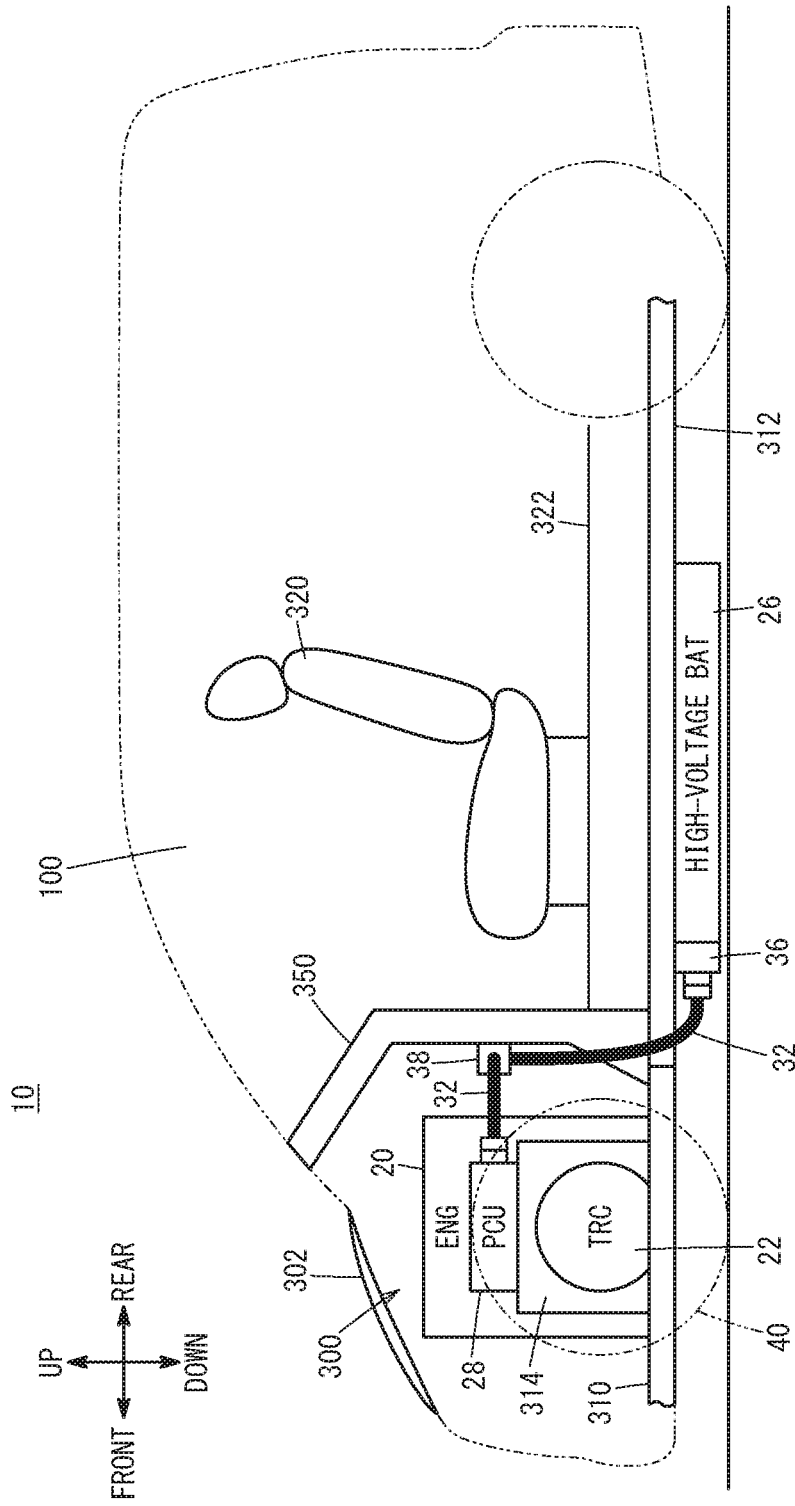
FIG. 1 is a side view that schematically illustrates the structure of a vehicle including a front junction box as a power distribution branch unit according to a first embodiment of the present invention.
Figure 2:
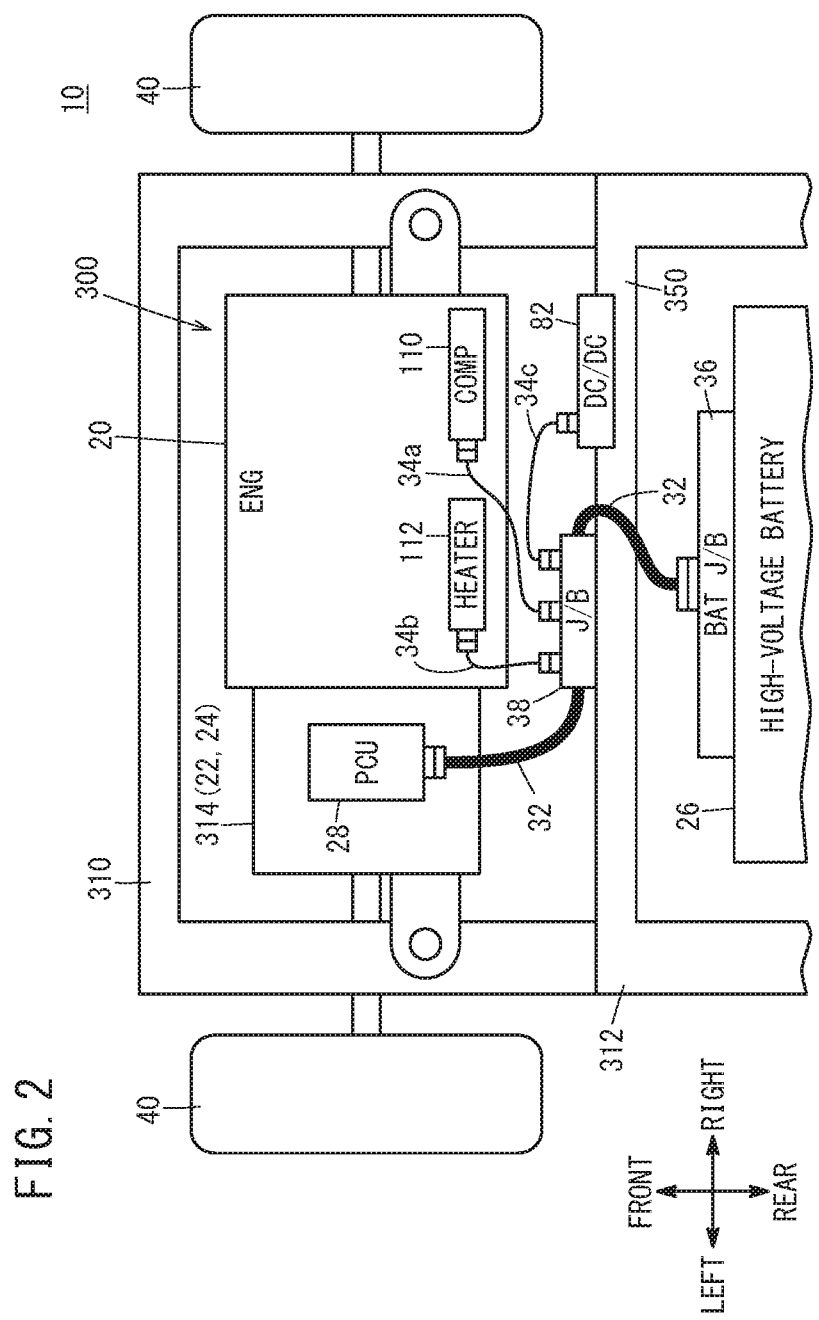
FIG. 2 is a plan view that schematically illustrates the structure of a front side of the vehicle according to the first embodiment.
Figure 3:
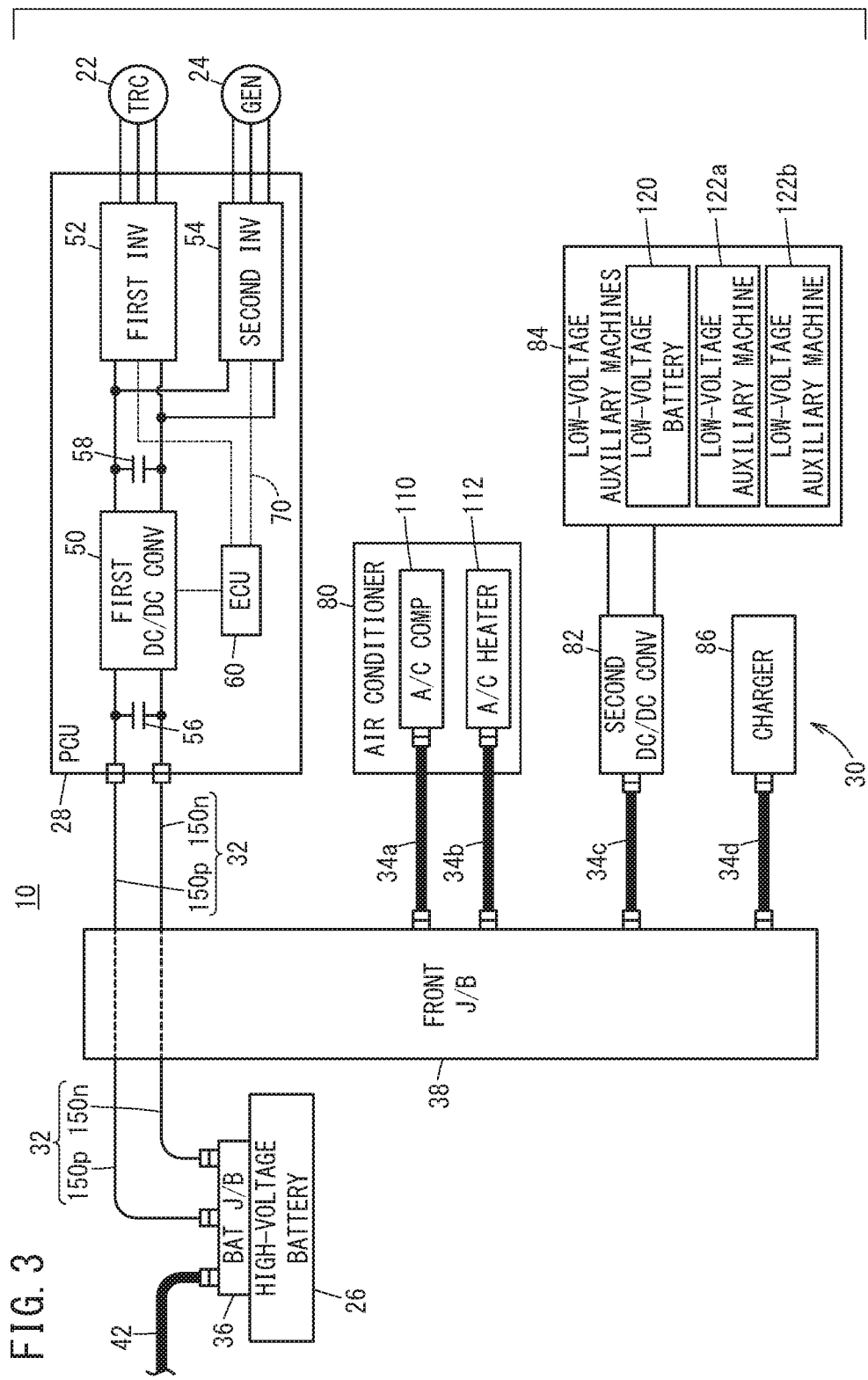
FIG. 3 is an electric circuit diagram that illustrates electric connections in the vehicle according to the first embodiment.

FIG. 1 is a side view that schematically illustrates the structure of a vehicle 10 including a front junction box 38 as a power distribution branch unit according to a first embodiment of the present invention. FIG. 2 is a plan view that schematically illustrates the structure of a front side of the vehicle 10 according to the first embodiment. FIG. 3 is an electric circuit diagram that illustrates electric connections in the vehicle 10 according to the first embodiment.

As illustrated in FIG. 1 to FIG. 3, the vehicle 10 includes, in addition to the front junction box 38, an engine 20, a travel motor 22, a generator 24, a high-voltage battery 26 (hereinafter, also referred to as "battery 26" or "BAT 26"), a power control unit 28 (hereinafter, referred to as "PCU 28"), electric auxiliary machines 30 (FIG. 3), main wiring 32, auxiliary machine wirings 34a to 34d (FIG. 3), and a battery junction box 36.

The vehicle 10 is a hybrid vehicle and uses the engine 20 and the travel motor 22 as a travel driving source. As will be described later, the vehicle 10 may be another type of vehicle. The generator 24 generates power using a driving power of the engine 20. The generator 24 may be used as the travel driving source.

The PCU 28 converts or regulates the power from the BAT 26 and/or the generator 24, and supplies the power to the travel motor 22. In addition, the PCU 28 converts or regulates power Pgen generated by the generator 24 and generated power of the travel motor 22 (regenerative power Preg), and charges the BAT 26.

[A-1-2. Travel Motor 22]

The travel motor 22 is three-phase AC brushless type, and generates motive power Ftrc as the travel driving source of the vehicle 10 and supplies the motive power Ftrc to a front wheel 40 (driving wheel) side. That is to say, the travel motor 22 is driven by one or both of the power Pbat from the high-voltage battery 26 and the power Pgen from the generator 24. In addition, the travel motor 22 performs regeneration when the vehicle 10 brakes, and supplies the regenerative power Preg to the battery 26. The regenerative power Preg may be supplied to the electric auxiliary machines 30.

Hereinafter, the travel motor 22 is also referred to as a TRC motor 22 or a motor 22. The TRC motor 22 may function as a generator, in addition to or instead of the function as a travel motor. Hereinafter, "TRC", "trc", or "t" is added to parameters regarding the travel motor 22. In addition, in FIG. 1 and FIG. 3, the travel motor 22 is expressed as "TRC".

[A-1-3. Generator 24]

The generator 24 is the three-phase AC brushless type, and functions as a generator that generates power by motive power Feng from the engine 20. The power Pgen generated by the generator 24 is supplied to the battery 26, the travel motor 22, or the electric auxiliary machines 30.

Hereinafter, the generator 24 is also referred to as GEN 24. The GEN 24 may function as a travel motor (traction motor), in addition to or instead of the function as a generator (power generation machine). Hereinafter, "GEN", "gen", or "g" is added to parameters regarding the generator 24. In addition, in FIG. 3, the generator 24 is expressed as "GEN". The generator 24 can be used as a starter motor of the engine 20.

[A-1-4. High-Voltage Battery 26]

The high-voltage battery 26 is an energy storage device (energy storage) that includes a plurality of battery cells and can output high voltage (several hundred volts). The high-voltage battery 26 may employ, for example, a lithium ion secondary battery, a nickel hydrogen secondary battery, or the like. The high-voltage battery 26 supplies the power to the travel motor 22 and is charged with the power generated by the generator 24. Instead of or in addition to the battery 26, an energy storage device such as a capacitor can be employed.

[A-1-5. PCU 28]

(A-1-5-1. Outline of PCU 28)

As illustrated in FIG. 3, the PCU 28 is disposed between the battery 26 (or the battery junction box 36), and the travel motor 22 and the generator 24. The PCU 28 converts or regulates the power from the battery 26 and/or the generator 24, and supplies the power to the travel motor 22. In addition, the PCU 28 charges the battery 26 by converting or regulating the power Pgen generated by the generator 24 and the regenerative power Preg of the travel motor 22.

As illustrated in FIG. 3, the PCU 28 includes a first DC/DC converter 50, a first inverter 52, a second inverter 54, a first capacitor 56, a second capacitor 58, and an electronic control unit 60 (hereinafter, referred to as "ECU 60").

(A-1-5-2. First DC/DC Converter 50)

The first DC/DC converter 50 (hereinafter, also referred to as "converter 50") is a step-up/down type converter. The converter 50 boosts the output voltage Vbat of the battery 26 (hereinafter, also referred to as "battery voltage Vbat"), and outputs the boosted voltage to the TRC motor 22. In addition, the converter 50 lowers the output voltage Vgen of the generator 24 (hereinafter, also referred to as "GEN voltage Vgen") or the output voltage Vtrc of the travel motor 22, and supplies the lowered voltage to the battery 26.

(A-1-5-3. First Inverter 52)

The first inverter 52 converts the direct current from the battery 26 into alternating current, and supplies the converted current to the travel motor 22. In addition, the first inverter 52 converts the alternating current from the travel motor 22 into direct current, and supplies the converted current to the battery 26 side.

(A-1-5-4. Second Inverter 54)

The second inverter 54 converts the alternating current from the generator 24 into direct current, and supplies the converted current to the battery 26 side and/or the travel motor 22 side. In addition, when the generator 24 is used as a travel driving source, the second inverter 54 converts the direct current from the battery 26 into alternating current, and supplies the converted current to the generator 24.

(A-1-5-5. First Capacitor 56 and Second Capacitor 58)

The first capacitor 56 and the second capacitor 58 function as smoothing capacitors.

(A-1-5-6. ECU 60)

The ECU 60 is a control circuit (or a control unit) that controls each part of the PCU 28, and includes an input/output unit, an operation unit, and a storage unit that are not shown. The input/output unit exchanges signals with parts of the vehicle 10 through signal lines 70 (communication lines). Note that in FIG. 3, the signal lines 70 are shown in a simplified form. The input/output unit includes an A/D conversion circuit (not shown) that converts an input analog signal into a digital signal.

The operation unit includes a central processing unit (CPU) and operates by executing programs stored in the storage unit. A part of the functions executed by the operation unit can be achieved by a logic integrated circuit (IC). The programs may be provided from outside through a wireless communication device (for example, a mobile phone or a smart phone) that is not shown. In the operation unit, a part of the programs can be achieved by hardware (circuit components).

The storage unit stores the programs and data to be used by the operation unit, and includes a random access memory (hereinafter, referred to as "RAM"). As the RAM, a volatile memory such as a register and a non-volatile memory such as a flash memory can be used. In addition to the RAM, the storage unit may include a read only memory (hereinafter, referred to as "ROM").

[A-1-6. Electric Auxiliary Machines 30]

(A-1-6-1. Outline of Electric Auxiliary Machines 30)

As illustrated in FIG. 3 etc., the electric auxiliary machines 30 include an air conditioner 80, a second DC/DC converter 82, low-voltage auxiliary machines 84, and a charger 86. The electric auxiliary machines 30 may include other electric auxiliary machines (for example, an external power feeding device).

(A-1-6-2. Air Conditioner 80)

The air conditioner 80 controls, for example, the temperature in a vehicle compartment 100 (FIG. 1), and includes an air compressor 110 and a heater 112. The air compressor 110 circulates fluid that is not shown (such as water). The fluid is used for heating and cooling in the air conditioner 80. The heater 112 heats the fluid.

(A-1-6-3. Second DC/DC Converter 82)

The second DC/DC converter 82 lowers, for example, the battery voltage Vbat, and outputs the lowered voltage to the low-voltage auxiliary machines 84.

(A-1-6-4. Low-Voltage Auxiliary Machines 84)

The low-voltage auxiliary machines 84 include power auxiliary machines that operate at low voltage (for example, 12 V). As illustrated in FIG. 3, the low-voltage auxiliary machines 84 include a low-voltage battery 120 and low-voltage auxiliary machines 122a, 122b (hereinafter, also referred to as "auxiliary machines 122a, 122b" or collectively referred to as "auxiliary machines 122"). In FIG. 3, two auxiliary machines 122 (122a, 122b) are illustrated; however, the number of auxiliary machines 122 may be one, or three or more.

The low-voltage battery 120 (hereinafter, also referred to as "12-V battery 120") supplies power at low voltage (for example, 12 V) to the auxiliary machines 122, and is a lead battery, for example. The auxiliary machines 122 are devices that operate at low voltage. Examples of the auxiliary machines 122 include a navigation device (not shown), a headlight (not shown), and the ECU 60.

[A-1-7. Main Wiring 32]

As illustrated in FIG. 3, the main wiring 32 is a power line that penetrates through a case 160 of the front junction box 38 and connects the PCU 28 and the battery junction box 36 of the high-voltage battery 26. It should be noted that, in FIG. 1 and FIG. 3, the components denoted by a reference sign "32" on both sides of the front junction box 38 are the same main wiring 32.

Figure 4:
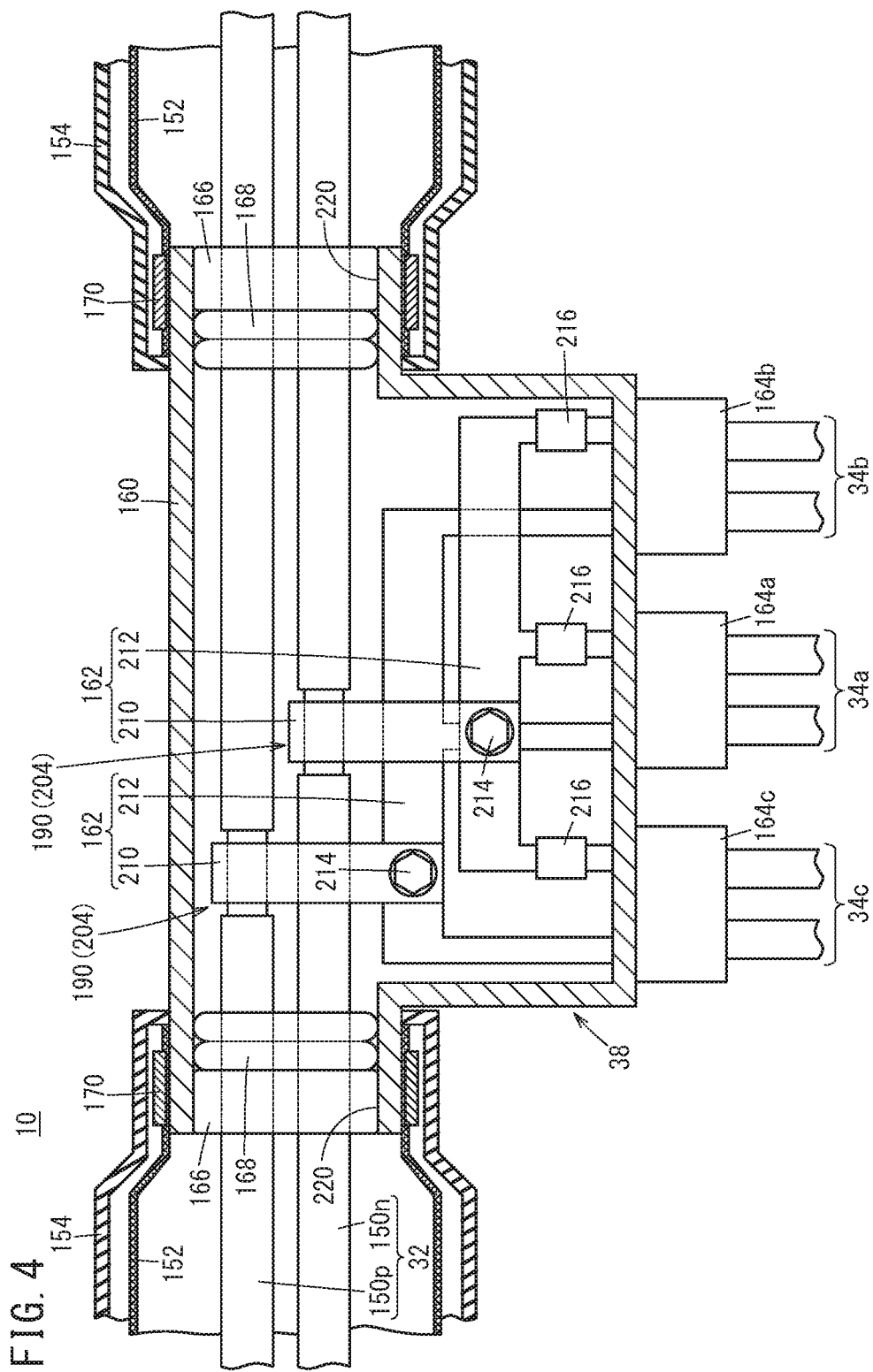
FIG. 4 is a cross-sectional view that schematically illustrates a part of the structure of a main wiring and the front junction box according to the first embodiment.

FIG. 4 is a cross-sectional view that schematically illustrates a part of the structure of the main wiring 32 and the front junction box 38 according to the first embodiment. As illustrated in FIG. 4, the main wiring 32 according to the first embodiment includes two covered cables 150$p$, 150$n$ (hereinafter, also referred to as "main covered cables 150$p$, 150$n$" or collectively referred to as "main covered cables 150"). Between the battery junction box 36 and the front junction box 38, and between the front junction box 38 and the PCU 28, a braided wire 152 is disposed around the covered cables 150$p$, 150$n$. In addition, a rubber boot 154 is disposed around the braided wire 152.

As will be described later, the main wiring 32 (covered cables 150$p$, 150$n$) forms a part of the front junction box 38. Therefore, details of the covered cables 150$p$, 150$n$ will be described later in association with the front junction box 38.

[A-1-8. Auxiliary Machine Wirings 34$a$ to 34$d$]

The auxiliary machine wirings 34$a$ to 34$c$ connect branch couplers 164$a$ to 164$c$ (FIG. 4) of the front junction box 38 and the electric auxiliary machines (the air compressor 110, heater 112, and the like). Three auxiliary machine wirings 34$a$ to 34$c$ are illustrated in FIG. 2 and FIG. 4 but the auxiliary machine wiring 34$d$ is not shown. Hereinafter, the auxiliary machine wirings 34$a$ to 34$d$ are collectively referred to as auxiliary machine wiring 34 and the branch couplers 164$a$ to 164$c$ are collectively referred to as branch couplers 164. The number of auxiliary machine wirings 34 and branch couplers 164 may be one, or two or more.

[A-1-9. Battery Junction Box 36] The battery junction box 36 (hereinafter, also referred to as "BAT J/B 36") branches the current from the high-voltage battery 26 and supplies the branched current to the front junction box 38, a power apparatus in a rear seat side (not shown), and the like. The BAT J/B 36 is provided to the high-voltage battery 26. In FIG. 3, the battery junction box 36 is connected to the power apparatus in the rear seat side through rear seat side wiring 42 (FIG. 3).

[A-1-10. Front Junction Box 38]

(A-1-10-1. Outline of Front Junction Box 38) The front junction box 38 (hereinafter, also referred to as "front J/B 38") branches the current from the high-voltage battery 26 and supplies the branched current to the PCU 28 and the electric auxiliary machines 30.

As illustrated in FIG. 4 etc., the front J/B 38 is disposed between the battery 26 (or BAT J/B 36) and the PCU 28. The front J/B 38 branches the current from the battery 26 and supplies the branched current to the PCU 28 and the electric auxiliary machines 30 (such as the air compressor 110 and heater 112).

As illustrated in FIG. 4 etc., the front junction box 38 includes the case 160, the main covered cables 150$p$, 150$n$, branch wirings 162, the branch couplers 164$a$ to 164$c$, retainers 166, grommets 168, and external caulking rings 170.

(A-1-10-2. Case 160)

As illustrated in FIG. 4, the case 160 houses a part of the main covered cables 150$p$, 150$n$, the branch wirings 162, the retainers 166, and the grommets 168. The case 160 is provided with a case-side tapered surface 180 (not shown in FIG. 4) to make it easier to hold the retainer 166. Details of the case-side tapered surface 180 will be described later with reference to FIG. 6 and FIG. 8.

(A-1-10-3. Main Covered Cables 150$p$, 150$n$)

Figure 5:
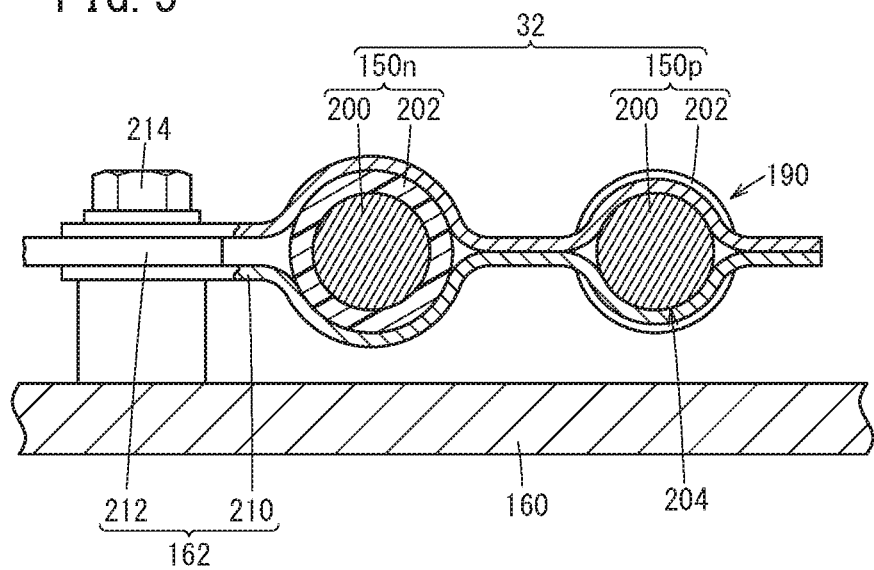
FIG. 5 schematically illustrates a connection part between a main covered cable and a branch wiring according to the first embodiment.

FIG. 5 schematically illustrates a connection part 190 between the main covered cable 150$p$ and the branch wiring 162 according to the first embodiment. As described above, the main covered cables 150$p$, 150$n$ penetrate through the case 160.

As illustrated in FIG. 5, each of the covered cables 150$p$, 150$n$ includes a core wire 200 and an insulation cover 202. At the connection part 190, an exposed part 204 where the core wire 200 is exposed, without the insulation cover 202, is formed inside the case 160. The exposed part 204 is formed by removing the insulation cover 202 using a cutter, for example. Alternatively, the formation of the insulation cover 202 on the exposed part 204 may be omitted during the process of covering the core wire 200 with the insulation cover 202.

FIG. 5 shows the connection part 190 between the covered cable 150$p$ and the branch wiring 162. The connection part 190 between the covered cable 150$n$ and the branch wiring 162 is formed in like manner (see FIG. 4).

(A-1-10-4. Branch Wiring 162)

One end of the branch wiring 162 is directly connected to the exposed part 204 of the main covered cable 150$p$, 150$n$. The branch wiring 162 branches into a plurality of other ends. The plurality of other ends is connected to the branch couplers 164$a$ to 164$c$ (see FIG. 4). Here, "directly connected" indicates that the branch wiring 162 is in contact with the core wire 200 of the main covered cable 150$p$, 150$n$. As illustrated in FIG. 4 and FIG. 5, the branch wirings 162 include fixing members 210 and bridge members 212 that are common.

The fixing member 210 is formed of a conductive material (for example, metal). The fixing member 210 holds and fixes the main covered cables 150$p$, 150$n$ using a bolt 214, and electrically connects to the core wire 200 of the main covered cable 150$p$, 150$n$.

The bridge member 212 connects the fixing member 210 and the branch couplers 164$a$ to 164$c$, and is formed as a bus bar in the first embodiment. The bridge member 212 is connected to the fixing member 210 by the bolt 214. The bridge member 212 branches to the branch couplers 164$a$ to 164$c$ at the connection with the fixing member 210. A fuse 216 is provided to each branch of the bridge member 212.

(A-1-10-5. Branch Couplers 164$a$ to 164$c$)

The branch couplers 164$a$ to 164$c$ are fixed to the case 160 and exposed to the outside, and connect the branch wiring 162 and the auxiliary machine wirings 34$a$ to 34$c$. As described above, the number of branch couplers 164 can be varied in accordance with the number of auxiliary machine wirings 34.

(A-1-10-6. Retainers 166)

Figure 6:
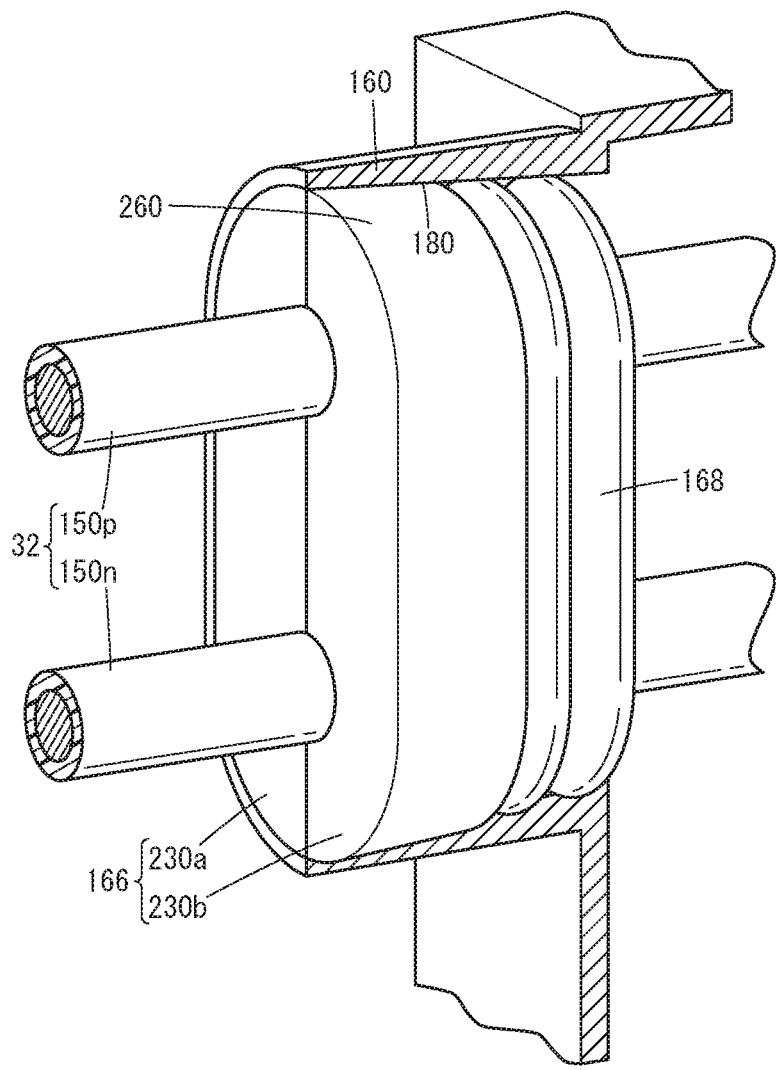
FIG. 6 is a perspective view that schematically illustrates a retainer according to the first embodiment and the vicinity thereof.
Figure 7:
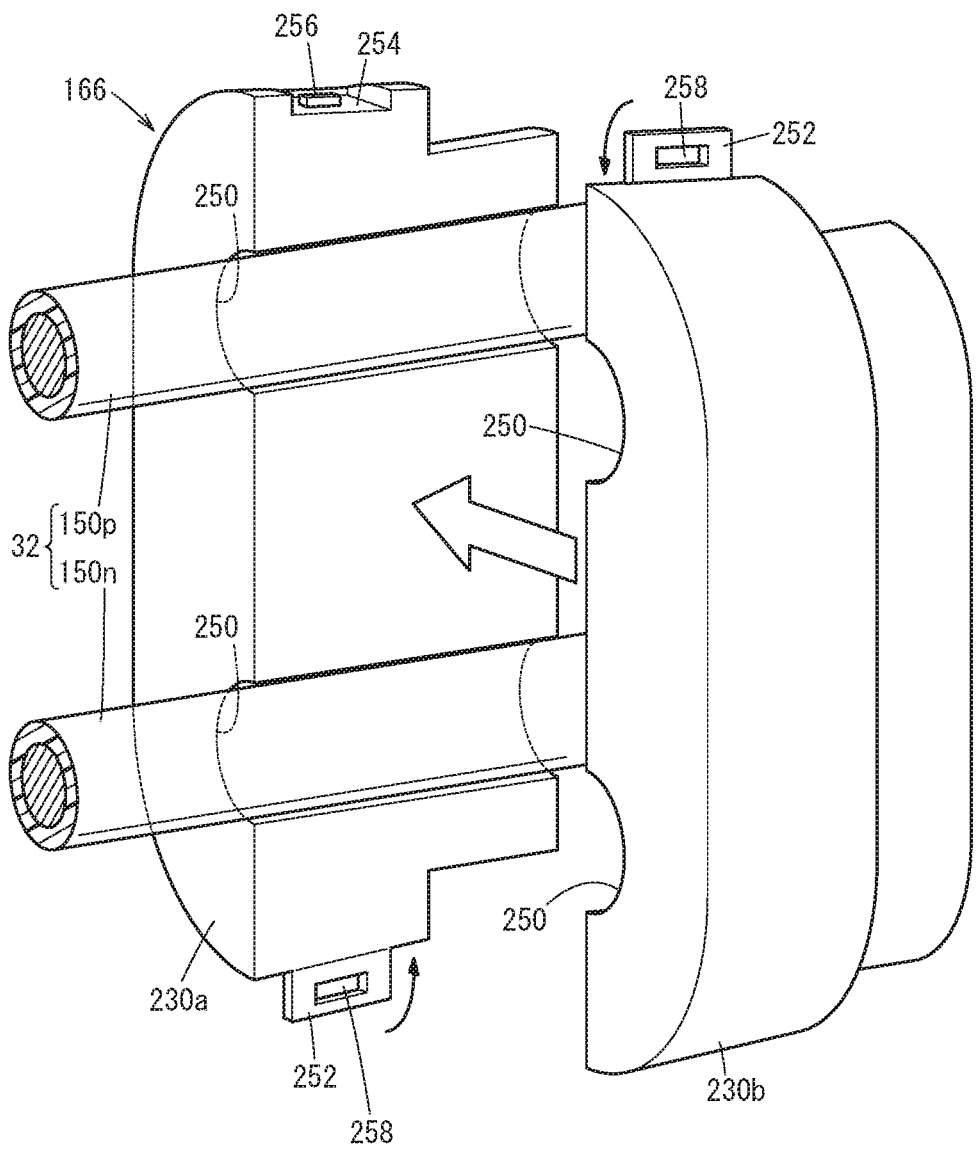
FIG. 7 is an exploded perspective view that schematically illustrates the retainer according to the first embodiment and the vicinity thereof.
Figure 8:
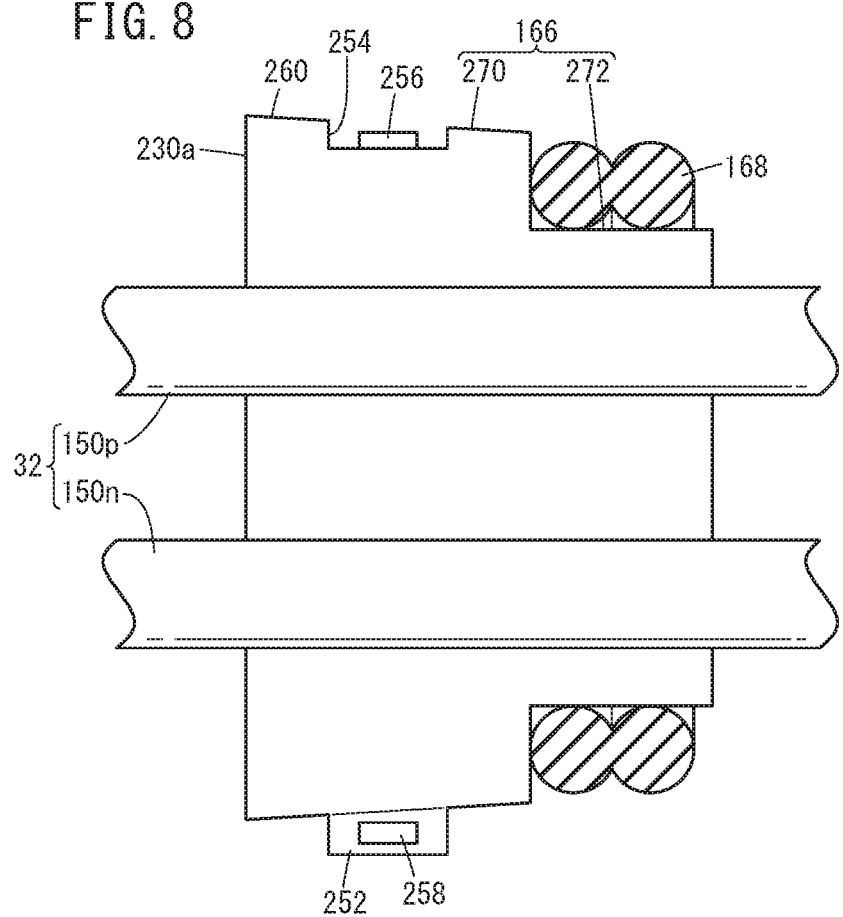
FIG. 8 is a cross-sectional view that schematically illustrates a part of the retainer according to the first embodiment and the vicinity thereof.

FIG. 6 is a perspective view that schematically illustrates the retainer 166 according to the first embodiment and the vicinity thereof. FIG. 7 is an exploded perspective view that schematically illustrates the retainer 166 according to the first embodiment and the vicinity thereof. FIG. 8 is a cross-sectional view that schematically illustrates a part of the retainer 166 according to the first embodiment and the vicinity thereof.

The retainer 166 is a resin member that is disposed inside a hole part 220 (FIG. 4) formed in the case 160, and that fixes the main covered cables 150p, 150n. In the first embodiment, the retainer 166 mainly fixes the main covered cables 150p, 150n. On the other hand, the grommet 168 mainly has a waterproof function to prevent water from entering the front junction box 38. Thus, the retainer 166 has lower elasticity and higher rigidity than the grommet 168.

As illustrated in FIG. 4, in the first embodiment, one retainer 166 is disposed on each side of the exposed parts 204 (or the connection parts 190) of the main covered cables 150p, 150n. As illustrated in FIG. 6 etc., each retainer 166 fixes the multiple main covered cables 150p, 150n together.

As illustrated in FIG. 6 and FIG. 7, the retainer 166 includes a first half body 230a and a second half body 230b. As illustrated in FIG. 7, the first half body 230a includes grooves 250, a claw part 252, a depressed part 254, and a raised part 256. The grooves 250 are portions where the main covered cables 150p, 150n are disposed, and they have an approximately semicircular shape when viewed from an axial direction of the main covered cables 150p, 150n. The depressed part 254 houses the entire claw part 252. The raised part 256 is formed in the depressed part 254, and engages with a fitting hole 258 of the claw part 252. In the first embodiment, there are two sets of claw parts 252, depressed parts 254, and raised parts 256. Therefore, the first half body 230a and the second half body 230b can be fixed together.

As illustrated in FIG. 6 and FIG. 8, a tapered surface 260 is formed on an outer peripheral surface of the retainer 166 (hereinafter, referred to as "retainer-side tapered surface 260"). The retainer-side tapered surface 260 inclines so as to separate from the main covered cables 150p, 150n toward the outside of the front junction box 38.

As illustrated in FIG. 6, the case 160 is provided with a tapered surface 180 that suits the retainer-side tapered surface 260 (a case-side tapered surface 180). The case-side tapered surface 180 is formed on an inner peripheral surface of the case 160, and inclines so as to separate from the main covered cables 150p, 150n toward the outside of the front junction box 38.

Thus, when an operator pushes the retainer 166 into the front junction box 38, the retainer-side tapered surface 260 and the case-side tapered surface 180 are held in a pressed state.

As illustrated in FIG. 8, the retainer 166 includes a case contact part 270 and a grommet contact part 272. The case contact part 270 is directly supported by or is in contact with the case 160. The grommet contact part 272 is supported by the case 160 through the grommet 168 (in contact with the grommet 168). In such a structure, the case contact part 270 mainly fixes the main covered cables 150p, 150n firmly, and the waterproof function is enhanced by the combination of the grommet contact part 272 and the grommet 168.

(A-1-10-7. Grommets 168)

The grommet 168 is a member that prevents water from entering the front junction box 38, and is made of rubber, for example.

(A-1-10-8. External Caulking Rings 170)

As illustrated in FIG. 4, the external caulking ring 170 caulks (or fixes) the case 160, the retainer 166, and the grommet 168 together outside the case 160.

A-2. Arrangement of Each Part

As illustrated in FIG. 1 and FIG. 2, the engine 20, the motor 22, the generator 24, and the PCU 28 are disposed inside a front-side room 300. The front-side room 300 functions as an engine room for the engine 20, a motor room for the motor 22, and a generator room for the generator 24.

As illustrated in FIG. 1, the front-side room 300 is surrounded by the vehicle compartment 100, a hood 302, and a sub frame 310 (a frame for the motor). The sub frame 310 is connected to a main frame 312.

The engine 20, the TRC motor 22, and the GEN 24 are supported by the sub frame 310. Between the engine 20 and the sub frame 310, an active control mount (ACM) that reduces vibration transmitted from the engine 20 to the sub frame 310 may be disposed. The PCU 28 is fixed on a motor housing 314 of the travel motor 22. Thus, the PCU 28 is supported by the sub frame 310 through the motor housing 314. In addition, the air compressor 110 and the heater 112 of the air conditioner 80 are supported by the sub frame 310.

As illustrated in FIG. 1, the PCU 28 is fixed to the motor housing 314 that houses the motor 22. The motor housing 314 according to the present embodiment houses the generator 24 in addition to the motor 22.

As illustrated in FIG. 1, the high-voltage battery 26 is disposed below a seat 320 in the vehicle compartment 100 or a floor 322, and supported by the main frame 312.

As illustrated in FIG. 1 etc., the front junction box 38 is disposed on or fixed to a dashboard 350. The dashboard 350 is a part that is disposed between the front-side room 300 and the vehicle compartment 100 and in front of the driver's seat and front passenger's seat. The dashboard 350 includes a dash panel.

A-23. Effect of First Embodiment

According to the first embodiment, the front junction box 38 (first power distribution branch unit) is fixed to the dashboard 350 that is different from the sub frame 310 (that supports the travel motor 22 and the PCU 28 (power conversion device)) or the main frame 312 (that supports the battery 26 (energy storage device)) (FIG. 1 and FIG. 2). Therefore, the vibration from the travel motor 22 is less likely to transmit to the front junction box 38. In the vehicle 10 that always generates vibration, the electric connection in the front junction box 38 can be maintained easily in a favorable manner.

According to the first embodiment, the vehicle 10 further includes the engine 20 that is supported by the sub frame 310 (FIG. 1 and FIG. 2). Thus, even if the engine 20 generates stronger vibration than the travel motor 22, the vibration from the engine 20 is less likely to be transmitted to the front junction box 38 (first power distribution branch unit). Therefore, the electric connection in the front junction box 38 can be maintained easily in a more favorable manner.

In the first embodiment, the battery junction box 36 (second power distribution branch unit) is provided to the high-voltage battery 26 (energy storage device) (FIG. 1 to FIG. 3). The front junction box 38 (first power distribution branch unit) is disposed between the battery junction box 36 and the PCU 28 (power conversion device) (FIG. 1 to FIG. 3). Thus, the wiring can be routed easily as compared to a case where a wiring that directly connects the battery junction box 36, and the PCU 28 and the electric auxiliary machines (such as the air conditioner 80) is provided without using the front junction box 38.

In the first embodiment, the engine 20, the travel motor 22, and the PCU 28 (power conversion device) are disposed on a front side of the vehicle 10 (FIG. 1 and FIG. 2). The front junction box 38 (first power distribution branch unit) is disposed on the dashboard 350 (FIG. 1 and FIG. 2). The electric auxiliary machines include the air conditioner 80 (FIG. 3).

Thus, even if the front junction box 38 is supported by or fixed to the dashboard 350 that is different from the sub frame 310 or the main frame 312, the front junction box 38 can be disposed in a position relatively close to the PCU 28. Furthermore, the front junction box 38 can be also disposed in a position relatively close to the air conditioner 80, in addition to the PCU 28; therefore, space saving can be easily achieved.

In the first embodiment, the air compressor 110 and the heater 112 in the air conditioner 80 are supported by the sub frame 310 (FIG. 2). The front junction box 38 (first power distribution branch unit) branches the current from the high-voltage battery 26 (energy storage device) and supplies the current to the PCU 28 (power conversion device), the air compressor 110, and the heater 112 (FIG. 2 and FIG. 3).

Thus, the front junction box 38 disposed on the dashboard 350 can branch the current relatively near the PCU 28, the air compressor 110, and the heater 112. Therefore, for example, as compared to a case in which the front junction box 38 is provided adjacent to the high-voltage battery 26, the wiring from the battery 26 to the front junction box 38 (for example, the main covered cables 150$p$, 150$n$) can be made long and the wiring from the front junction box 38 to the PCU 28, the air compressor 110, or the heater 112 (for example, the main covered cables 150$p$, 150$n$ and/or branch wiring 162) can be made short. Therefore, the total amount of wirings to be used can be reduced and the wirings can be led easily.

In the first embodiment, the front junction box 38 (first power distribution branch unit) includes: the case 160; the main covered cables 150$p$, 150$n$ configured to penetrate through the case 160 and including the exposed part 204 where the core wire 200 is exposed without the insulation cover 202 inside the case 160; the branch wiring 162 disposed inside the case 160 and having one end connected to the exposed part 204 of the main covered cables 150$p$, 150$n$; the branch couplers 164$a$ to 164$c$ connected to another end of the branch wiring 162 and fixed to the case 160 so as to be exposed to an outside; and the retainer 166 disposed inside a hole part 220 that is formed in the case 160 and configured to fix the main covered cables 150$p$, 150$n$ (FIG. 4).

In the first embodiment, the main covered cables 150$p$, 150$n$ penetrate through the case 160. On the other hand, the branch couplers 164$a$ to 164$c$ are disposed through the branch wiring 162 that is connected to the exposed part 204 of the main covered cable 150$p$, 150$n$. Thus, by branching the power line without a connector (coupler), layout flexibility can be improved and the front junction box 38 can be downsized.

The branch wiring 162 and the core wire 200 that is exposed without the insulation cover 202 are connected. Thus, the position of the exposed part 204 of the core wire 200 can be selected; therefore, the layout flexibility is improved.

Furthermore, the main covered cables 150$p$, 150$n$ are fixed by the case 160 through the retainer 166. Thus, if vibration is transmitted from the outside to the inside of the case 160 through the main covered cables 150$p$, 150$n$, the retainer 166 can absorb the vibration. In particular, if the vibration absorption characteristic of the retainer 166 is higher than that of the case 160 itself, the vibration can be easily absorbed. Thus, the vibration from the outside is less likely to reach the connection part 190 where the branch wiring 162 and the exposed part 204 of the core wire 200 are connected. Therefore, it becomes easy to prevent the separation between the core wire 200 and the branch wiring 162 due to vibration reaching the connection part 190 from outside.

In the first embodiment, the fuse 216 is provided to the branch wiring 162 (FIG. 4). Thus, even if vibration always occurs due to the travel motor 22 or the like, the connection of the fuse 216 can be maintained easily in a favorable manner.

B. Second Embodiment

B-1. Structure

Figure 9:
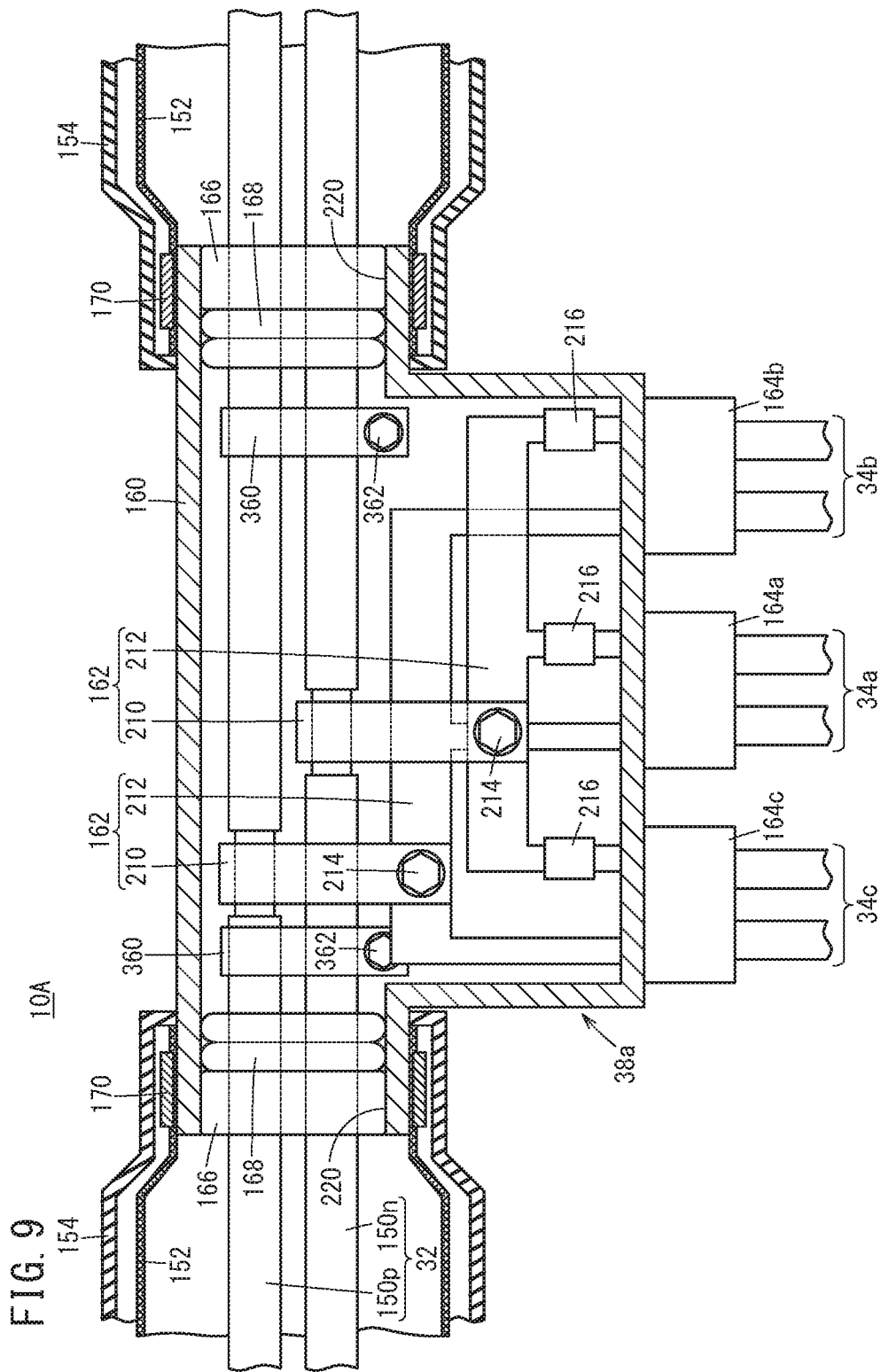
FIG. 9 is a cross-sectional view that schematically illustrates a part of the structure of the main wiring and a front junction box according to a second embodiment.

FIG. 9 is a cross-sectional view that schematically illustrates a part of the structure of the main wiring 32 and a front junction box 38$a$ according to a second embodiment. The structure of a vehicle 10A according to the second embodiment is basically the same as the structure of the vehicle 10 according to the first embodiment. Hereinafter, the same reference signs denote the common components in the first embodiment and the second embodiment, and detailed description thereof is not repeated.

In the first embodiment, the main covered cables 150$p$, 150$n$ are fixed by the branch wiring 162, the retainers 166, and the grommets 168 (FIG. 4, FIG. 5). On the other hand, in the front junction box 38$a$ according to the second embodiment, the main covered cables 150$p$, 150$n$ are fixed by internal fixing members 360, in addition to the branch wirings 162, the retainers 166, and the grommets 168.

Figure 10:
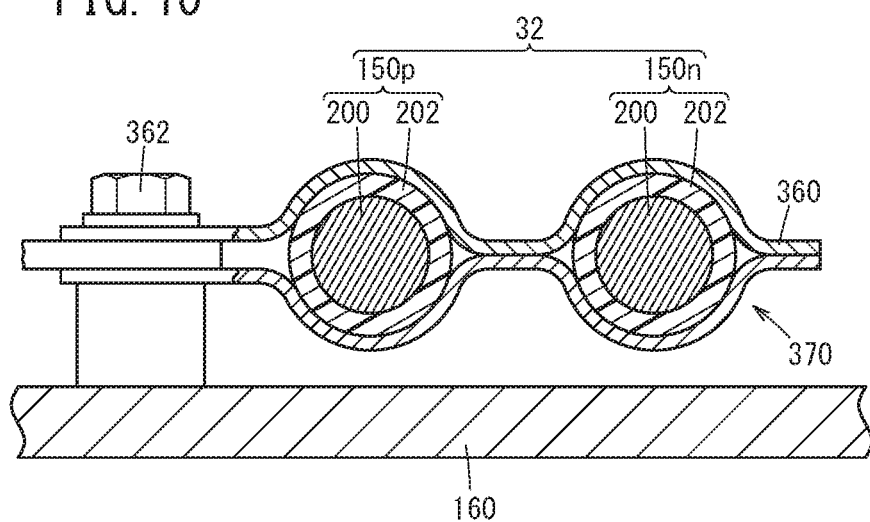
FIG. 10 schematically illustrates a connection part between the main covered cables and an internal fixing member according to the second embodiment.

FIG. 10 schematically illustrates a connection part 370 between the main covered cables 150$p$, 150$n$ and the internal fixing member 360 according to the second embodiment. At the connection part 190 between the main covered cables 150$p$, 150$n$ and the branch wiring 162, the core wire 200 is exposed (FIG. 4 and FIG. 5). On the other hand, at the connection part 370 where the main covered cables 150$p$, 150$n$ and the internal fixing member 360 are connected, the core wires 200 are covered with the insulation covers 202 (FIG. 9 and FIG. 10). That is to say, the internal fixing member 360 holds the core wires 200 and the insulation covers 202 together, and is fixed to the case 160 using a bolt 362.

B-2. Effect of Second Embodiment

In the second embodiment as above, the following effects are obtained, in addition to or instead of the effects in the first embodiment.

That is to say, in the second embodiment, the front junction box 38$a$ (power distribution branch unit) includes the internal fixing members 360 that fix the main covered cables 150$p$, 150$n$ to the case 160 without being in contact with the core wires 200 inside the case 160 (FIG. 9 and FIG. 10). Thus, since the main covered cables 150$p$, 150$n$ are fixed by the internal fixing members 360 in addition to the retainers 166 and the like, the connection in the connection part 190 between the main covered cables 150$p$, 150$n$ and the branch wiring 162 is maintained easily in a more favorable manner.

C. Modifications

Note that the present invention is not limited to the above embodiments, and can employ various structures on the basis of the description in this specification. For example, the following structure can be employed.

C-1. Application Targets

The vehicle 10 according to the first embodiment includes the engine 20, the travel motor 22, and the generator 24 (FIG. 1). However, the present invention is not limited to this structure from the viewpoint of fixing the front junction box 38 to a part of the vehicle body other than the sub frame 310 and the main frame 312, for example. For example, the vehicle 10 may be an electric vehicle that does not include the engine 20 (for example, an electric automobile or a fuel cell vehicle). Alternatively, the vehicle 10 may include a plurality of travel motors 22 and generators 24. This structure is similarly applicable to the vehicle 10A according to the second embodiment.

C-2. Rotary Electric Machine

The travel motor 22 and the generator 24 in the first embodiment are the three-phase AC brushless type (FIG. 3). However, the present invention is not limited to the example from the viewpoint of fixing the front junction box 38 to a part of the vehicle body other than the sub frame 310 and the main frame 312, for example. The travel motor 22 and the generator 24 may be DC type or brush type. This example is similarly applicable to the second embodiment.

C-3. Power Source

In the first embodiment, it is assumed that a main power source that supplies power to the inside of the vehicle 10 is the high-voltage battery 26 (FIG. 1 to FIG. 3). However, the present invention is not limited to this structure from the viewpoint of fixing the front junction box 38 to a part of the vehicle body other than the sub frame 310 and the main frame 312, for example. The main power source may be the generator 24, for example (that is to say, the generator 24 can be used as a range extender). In this case, the main covered cables 150p, 150n can be disposed between the generator 24 and the PCU 28, and the main covered cables 150p, 150n can be branched into the branch wirings 162 inside a junction box that is similar to the front junction box 38. This example is similarly applicable to the second embodiment.

C-4. PCU 28

In the first embodiment, the PCU 28 includes the first DC/DC converter 50, the first inverter 52, the second inverter 54, the first capacitor 56, the second capacitor 58, and the ECU 60 (see FIG. 3). However, the present invention is not limited to the structure from the viewpoint of converting (or regulating) the power from the high-voltage battery 26 and supplying the power to the travel motor 22.

For example, the first DC/DC converter 50 may be omitted from the PCU 28. Alternatively, the second inverter 54 may be omitted from the PCU 28 (in this case, the generator 24 is also omitted). Alternatively, the first inverter 52 (and the first DC/DC converter 50) may be omitted if the travel motor 22 is DC type. Note that PCU 28 can include an on/off switch as a process to convert (or regulate) the power from the high-voltage battery 26 if the first DC/DC converter 50 and the first inverter 52 are omitted. This structure is similarly applicable to the second embodiment.

C-5. Front Junction Box 38

[C-5-1. Structure]

(C-5-1-1. Main Covered Cables 150p, 150n)

In the first embodiment, the number of the main covered cables 150 is two in the front junction box 38 (FIG. 4, for example). However, the present invention is not limited to the example from the viewpoint of branching the current in the front junction box 38, for example. The number of main covered cables 150 may be one, or three or more in the front junction box 38. This example is similarly applicable to the second embodiment.

In the first embodiment, the main covered cables 150p, 150n penetrate through the case 160 of the front junction box 38 (FIG. 4). However, the present invention is not limited to this structure from the viewpoint of fixing the front junction box 38 to a part of the vehicle body other than the sub frame 310 and the main frame 312, for example. For example, the main covered cable 150p may be divided into two cables, and one cable may connect the battery 26 and the front junction box 38 and the other cable may connect the front junction box 38 and the PCU 28. In this case, a wiring (such as a bus bar) is provided inside the front junction box 38 in order to connect the two cables. The main covered cable 150n can also be formed in a manner similar to the main covered cable 150p. This example is similarly applicable to the second embodiment.

(C-5-1-2. Branch Wiring 162)

The branch wiring 162 in the first embodiment is formed as a bus bar (FIG. 4, for example). However, in regard to the wiring branched from the main covered cables 150p, 150n, the branch wiring 162 may be formed as a member other than a bus bar (for example, a covered cable). This structure is similarly applicable to the second embodiment.

(C-5-1-3. Retainer 166)

In the first embodiment, two retainers 166 are provided (FIG. 4). However, the present invention is not limited to the example from the viewpoint of fixing one or more main covered cables 150, for example. The number of retainers 166 may be one, or three or more. This example is similarly applicable to the second embodiment.

In the first embodiment, one retainer 166 fixes two main covered cables 150p, 150n (FIG. 4, for example). However, the present invention is not limited to the example from the viewpoint of fixing the main covered cables 150p, 150n, for example. For example, one retainer 166 may be provided for each main covered cable 150. Alternatively, when three or more main covered cables 150 are provided, one retainer 166 can fix the three or more main covered cables 150. This example is similarly applicable to the second embodiment.

In the first embodiment, the retainer 166 and the grommet 168 are provided as separate members (FIG. 4, for example). However, the present invention is not limited to the example from the viewpoint of fixing the main covered cable(s) 150, for example. The retainer 166 may have a function as the grommet 168 (or the grommet 168 may have a function as the retainer 166).

The retainer 166 in the first embodiment fixes the first half body 230a and the second half body 230b to each other by using two sets of claw parts 252, depressed parts 254, and raised parts 256 (FIG. 7, for example). However, the present invention is not limited to the example from the viewpoint of fixing the main covered cable(s) 150, for example. For example, the number of sets of the claw parts 252, depressed parts 254, and raised parts 256 may be one when the first half body 230a and the second half body 230b are connected by a hinge structure.

The retainer 166 in the first embodiment is formed of the first half body 230a and the second half body 230b (FIG. 7, for example). However, the present invention is not limited to the example from the viewpoint of fixing the main covered cable(s) 150, for example. For example, the retainer 166 may be formed of only one member without separating the member into the first half body 230a and the second half body 230b.

[C-5-2. Arrangement]

In the first embodiment, the front junction box 38 is fixed to the dashboard 350 (FIG. 1 and FIG. 2). However, the present invention is not limited to the structure from the viewpoint of fixing the front junction box 38 to a part of the vehicle body that is different from the sub frame 310 and the main frame 312, for example. The front junction box 38 can be fixed to a side frame or a damper housing of the vehicle 10, for example. Note that the side frame is a frame that extends from the main frame 312 toward the front side of the vehicle 10 and is positioned at the side of the front-side room 300. The damper housing is a housing for a damper of the front wheel 40 (FIG. 1 and FIG. 2).

The present invention is not particularly limited to the embodiments described above, and various modifications are possible without departing from the essence and gist of the present invention.

What is claimed is:

1. A vehicle comprising:
a travel motor;
an energy storage device configured to supply power to the travel motor;
a power conversion device disposed between the travel motor and the energy storage device;
an electric auxiliary machine; and
a first power distribution branch unit disposed between the energy storage device and the power conversion device and configured to branch current from the energy storage device and supply the current to the power conversion device and the electric auxiliary machine, wherein:
the travel motor and the power conversion device are supported by a sub frame;
the energy storage device is supported by a main frame; and
the first power distribution branch unit is fixed to a part of a vehicle body that is different from the sub frame and the main frame,
the travel motor and the power conversion device are disposed on a front side of the vehicle;
the first power distribution branch unit is disposed on a dashboard;
the electric auxiliary machine includes an air conditioner;
an air compressor and a heater of the air conditioner are supported by the sub frame; and
the first power distribution branch unit is configured to branch current from the energy storage device and supply the current to the power conversion device, the air compressor, and the heater.

2. The vehicle according to claim 1, further comprising an engine supported by the sub frame.

3. The vehicle according to claim 1, wherein:
the energy storage device is provided with a second power distribution branch unit; and
the first power distribution branch unit is disposed between the second power distribution branch unit and the power conversion device.

4. The vehicle according to claim 2, wherein:
the engine is disposed on the front side of the vehicle.

5. A vehicle comprising:
a travel motor;
an energy storage device configured to supply power to the travel motor;
a power conversion device disposed between the travel motor and the energy storage device;
an electric auxiliary machine; and
a first power distribution branch unit disposed between the energy storage device and the power conversion device and configured to branch current from the energy storage device and supply the current to the power conversion device and the electric auxiliary machine, wherein:
the travel motor and the power conversion device are supported by a sub frame;
the energy storage device is supported by a main frame; and
the first power distribution branch unit is fixed to a part of a vehicle body that is different from the sub frame and the main frame, the first power distribution branch unit comprising:
a case;
at least one main covered cable configured to penetrate through the case and including an exposed part where a core wire is exposed without an insulation cover inside the case;
a branch wiring disposed inside the case and having one end connected to the exposed part of the main covered cable;
a branch coupler connected to another end of the branch wiring and fixed to the case so as to be exposed to an outside; and
at least one retainer disposed inside a hole part that is formed in the case and configured to fix the main covered cable.

6. The vehicle according to claim 5, wherein a fuse is provided to the branch wiring.

* * * * *